Feb. 26, 1957 B. C. CHRISTESON 2,782,818
THERMO-PRESSURE MACHINE FOR FORMING PANEL ASSEMBLIES
Filed March 14, 1955 3 Sheets-Sheet 1
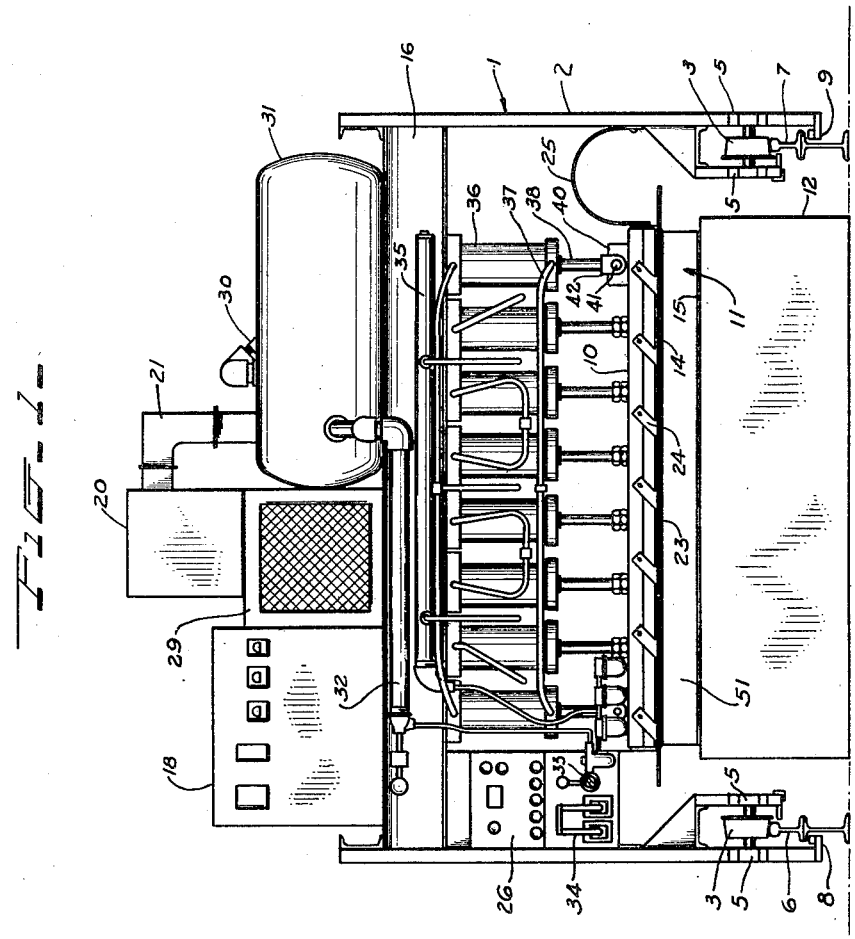
INVENTOR
Blaine C. Christeson.
BY Roy A. Plant
ATTORNEY

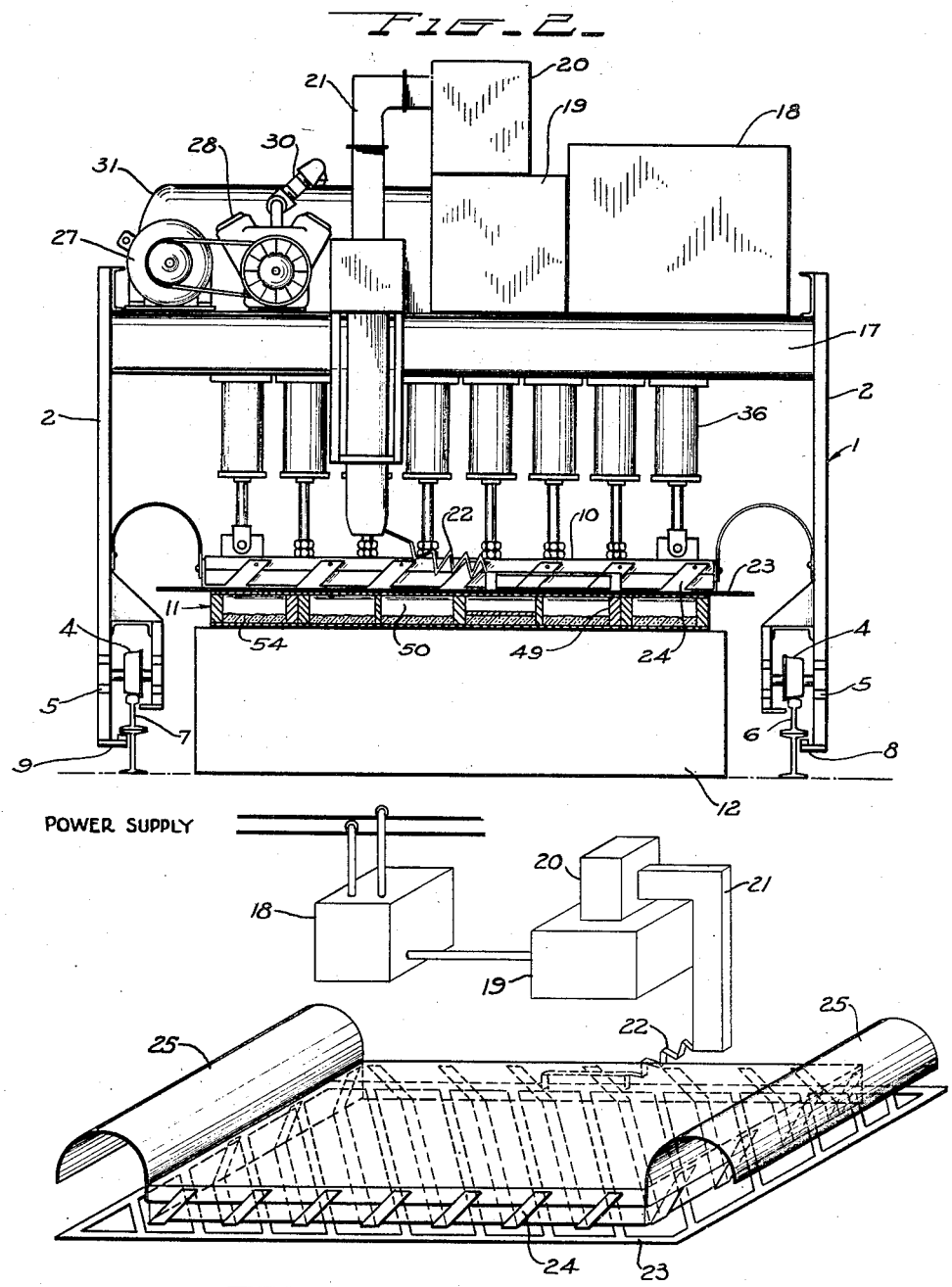

Feb. 26, 1957        B. C. CHRISTESON        2,782,818
THERMO-PRESSURE MACHINE FOR FORMING PANEL ASSEMBLIES
Filed March 14, 1955        3 Sheets-Sheet 3
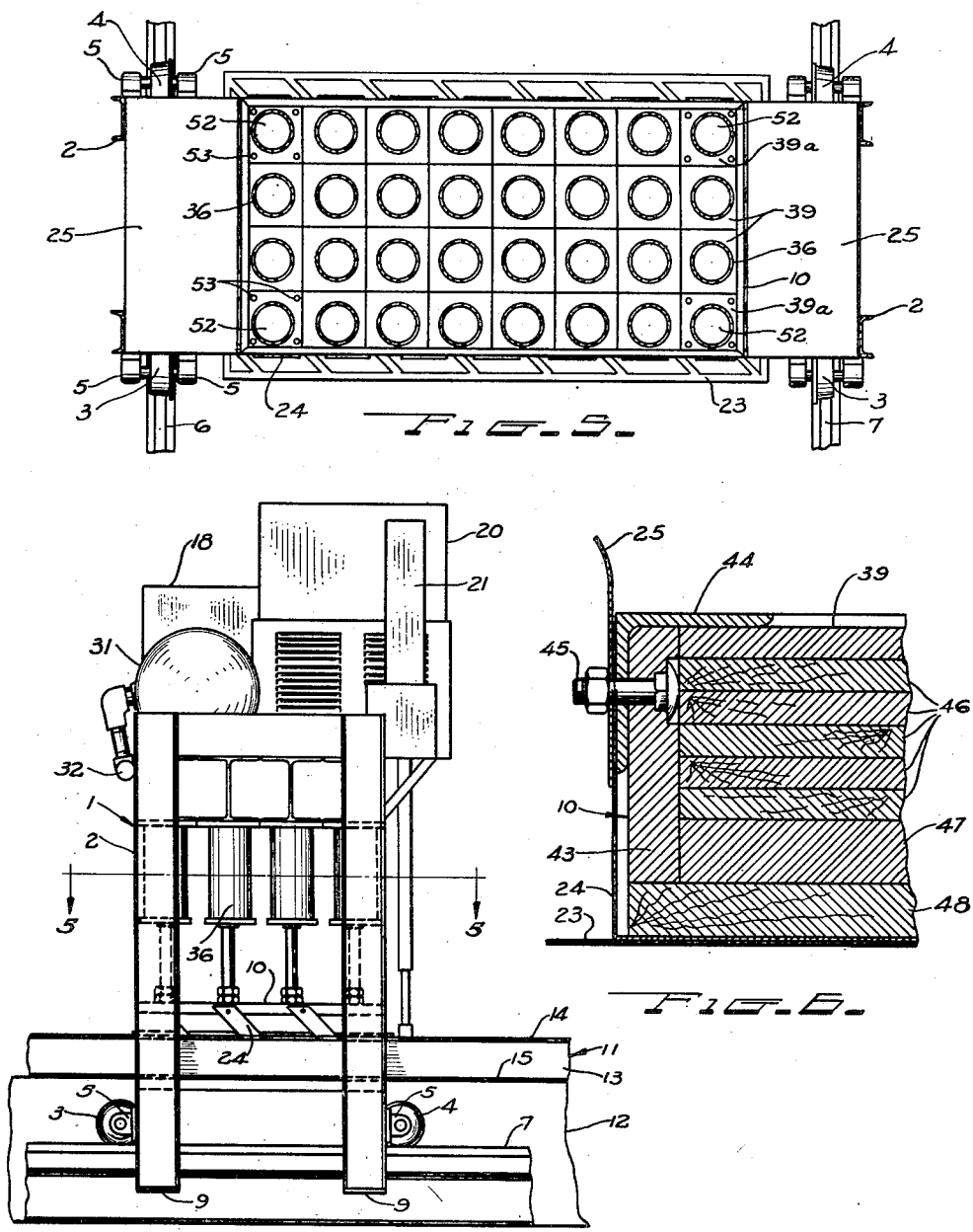
INVENTOR
Blaine C. Christeson.
BY Roy A. Plant
ATTORNEY

United States Patent Office 2,782,818
Patented Feb. 26, 1957

2,782,818

THERMO-PRESSURE MACHINE FOR FORMING PANEL ASSEMBLIES

Blaine C. Christeson, East Tawas, Mich., assignor to Anderson Coach Company, East Tawas, Mich., a corporation of Michigan Application March 14, 1955, Serial No. 494,177

14 Claims. (Cl. 144—281)

The present invention relates broadly to an apparatus for manufacturing composite panels, and more specifically to an apparatus for producing hollow core trailer coach floor panels by adhesive bonding of the assembly under pressure and with heat produced through the use of ultra high frequency electric current.

Trailer coaches, for many years, have universally used a floor construction in the form of a platform having longitudinal floor joists with cross sleepers and end members conventionally covered with flooring, which recently has been in the form of plywood panels nailed to its top face, while the underface was covered with a nailed on insulating sheet, such as "Cellotex" which was either protected with a thin sheet of metal or tarred to make it waterproof. This assembly, conventionally 3½ inches thick, was mounted on a steel frame extending from end to end of same, and provided with a towing connection at the forward end of the frame. While trailer coaches utilizing that type of floor construction were made and sold by the thousands, and still are, they have not been wholly satisfactory since they lacked the strength, stiffness, and rigidity essential to prevention of undesirable sagging both fore and aft of the axle assembly on which the trailer coach is mounted for mobility. That lack of strength, stiffness, and rigidity has been still further pronounced in those constructions where attempts have been made to provide heated floors, and which required cutting away portions of the longitudinal floor joists and cross sleepers. The application of cold glue before nailing these platforms has been attempted but has not been found wholly satisfactory due to the inability to obtain uniform pressure on the glued areas merely by nailing as well as the lack of a heat fused glue bond, and thus the glue has not been as efficiently or effectively used as is desired.

It is realized that plywood panels produced from multiple thin wooden sheets have been made by applying glue to the faces of the wooden sheets in the area to be joined, followed by the application of pressure, and heat, but such pressure has been universally applied by means of a rigid platen having one continuous face in contact with the composite plywood sheet, and this has been true even where such platen has been supplied with heat, for instance, by means of a steam jacket. In that case, in addition to the nonuniformity of pressure, there has also been the exceeding slowness in driving the heat through the panel to set up the glue. It was a knowledge of these difficulties and problems of the prior constructions and a recognition that no fully adequate solution had been proposed in the hollow core panel field, which lead to the conception and development of the present invention.

Accordingly among the objects of the present invention is the provision of an improved apparatus for producing composite hollow panels, such as trailer coach floor panels of unit construction.

Another object is to provide an apparatus for heat and pressure bonding of the top and bottom plywood face panels of a trailer coach floor panel assembly where such panels are mounted on a framework of floor joists, cross sleepers, and end members, the panel contacting edges of which have been coated with plastic glue adapted to be set up by suitable application of heat.

Another object is to provide an apparatus adapted to support the platform member in fixed location while the heat and pressure applying portion of the apparatus is movable from place to place along the length of the platform to bond same a portion at a time.

Another object is to provide a rapidly operating apparatus adapted for fast clamping of the platform, and fast heating of the face of same for bonding the clamped area.

Another object is to provide an apparatus which utilizes multiple cylinders each of which has its own pressure plate to apply localized pressure to the face of the platen to facilitate uniformly forcing same against the face of the platform being glued so as to obtain a more uniform bond throughout the glue coated area of same.

A further object is to provide an apparatus with a special type of platen assembly adapted to flex to a limited extent under localized application of pressure at a multiplicity of points, so as to more closely follow conventional thickness variations in sheet plywood, and more uniformly press same against the framework of floor joists, cross sleepers, and end members so as to make possible improved bonding of same under application of heat and pressure.

A further object is to provide the platform bonding apparatus with a platen member which is supported and moved by double acting cylinders connected to each corner of same, while between those double acting cylinders are a series of single acting cylinders adapted to apply pressure to the platen assembly during the platform bonding step.

Still further objects and advantages of the invention will appear as the description proceeds.

To the accomplishment of the foregoing and related ends, the invention, then, consists of the means hereinafter fully described and particularly pointed out in the claims, the annexed drawings and the following description setting forth in detail certain means for carrying out the invention, such disclosed means illustrating, however, but one of various ways in which the principle of the invention may be used.

In the annexed drawings:

Figure 1 shows a front side elevation of a preferred form of the apparatus of the present invention.

Figure 2 shows an elevation of the opposite side of the apparatus from that shown in Figure 1.

Figure 3 shows an end elevation as seen from the right in Figure 1.

Figure 4 shows diagrammatically in perspective manner a schematic wiring diagram as applied in connection with the platen of the apparatus of the present invention.

Figure 5 shows a section view as taken at line 5—5 of Figure 3, looking in the direction of the arrows.

Figure 6 shows an enlarged fragmentary vertical section view of one end of the platen of the apparatus.

Referring more particularly to Figures 1, 2, and 3 of the drawings it will be noted that the general assembly 1 has a main frame 2 with the lower portion of the outer ends of same having mounted thereon flanged fore and aft wheels 3, and 4 conventionally mounted on pillow blocks 5, and running on tracks 6 and 7. In addition the lower portion of said main frame 2 has inwardly projecting holding members 8 and 9 adapted to engage under the track members 6 and 7, respectively, to limit the upward movement of the general assembly 1 when pressure is applied to the upper face of platen 10, as will be hereinafter described in detail.

The composite panel 11 to be bonded together, as will be hereinafter set forth, is mounted on a supporting deck 12 which extends lengthwise of tracks 6 and 7, and between same. The upper face of this supporting deck 12 is made substantially flat to fit the lower face of composite panel 11, and parallel to the top of said tracks to facilitate operation of the assembly for bonding a panel such as a trailer coach floor panel. Those panels are of the conventional construction where there is an open framework 13 having floor joists 49, cross sleepers 50, and end members 51, on which is mounted an upper plywood panel 14 and a lower plywood panel 15 which, in preferred construction, are respectively ½" and ¼" thick, although they are not limited to those particular thicknesses. The top and bottom faces of such open framework are coated with a suitable plastic glue, which preferably is of the thermo-setting plastic type, of which the urea resin plastic glues are very satisfactory, the plywood panels 14 and 15 applied thereto and nailed with a very few nails (not shown), the heads of which are countersunk. This nailing is for the purpose of holding the plywood panels in place during the bonding of same to the framework and also to allow the floor panel to be turned over for bonding the second side in place on said framework.

Main frame 2 is provided at the upper end of same with fore and aft rigid cross beams 16 and 17, on which is mounted, Figure 4, an electronic ultra high frequency voltage power supply assembly 18 which includes an oscillator 19, tuner 20, and coaxial line 21. This coaxial line 21 is connected by means of a suitable flexible lead 22 to the positive grid assembly 23 on the under face of platen 10. This grid assembly may be laid in any suitable pattern although for most purposes angular mounting, such as at 45° with the fore and aft edges of the platen, is highly satisfactory. The negative grid assembly 24 is placed in like pattern on the under face of the platen but spaced from the positive grid so as to avoid short circuiting on same. This negative grid assembly is grounded to the main frame 2 by means of a flexible metal member 25 to complete the electrical circuit under operating conditions through control panel 26, Figure 1. The positive and negative grid assemblies are preferably made out of thin strip material of good electrical conducting properties, such as metal. When the power is turned on, the ultra high frequency voltage power flows between the positive and negative grid assemblies through the plywood panel with which they are in contact, and in doing so quickly heats same and sets up the plastic glue, which can be of either the thermo-plastic or thermo-setting types, although the latter is preferred since once it has been set up, extreme heat or other adverse conditions do not effect it, to bond the contacted plywood panel to the adjacent face of the open framework 13.

Also mounted on the fore and aft upper cross beams 16 and 17 is an electric motor 27 conventionally connected to an air compressor 28 which has an air inlet through air filter 29 and a compressed air outlet line 30 connected to pressure tank 31. The compressed air outlet line 32 leads from pressure tank 31 through a conventional moisture remover and air oiling assembly 33 to an operating valve 34 which is conventionally connected to a header 35 operatively connected to the upper ends of a series of cylinders 36. All but the four corner cylinders are of single acting construction, while the corner cylinders are double acting so that when pressure is released from the upper end of the cylinders by means of operating valve 34, such valve will, through conventional connections, supply air through an air pressure line 37 to the lower ends of each of the corner cylinders to move the piston 52 of same upward and by means of piston rods 38 to lift platen 10 as will be hereinafter described. During the lifting action the upper ends of these corner air cylinders will be connected to air relief the same as the other cylinders, while on the downstroke the lower end of each of these four corner cylinders will likewise be connected to air relief in conventional manner and which normally can be handled by means of a conventional two-way operating valve 34.

While any convenient number of cylinders can be used, the actual machine which has been developed through long and extensive experimentation, and which is in use, has thirty-two air cylinders as is shown in the drawings. Below each cylinder, as is shown in Figure 5, there is placed on top of the platen 10 some substantially square metal plates 39 and 39a which are rigid and preferably fit edge to edge with each plate substantially centered under a corresponding air cylinder. The four corner plates 39a are anchored by means of bolts 53, or the like, direct to platen 10, while the remaining plates 39 are preferably loose on top of the platen. These corner plates 39a in turn each have an upwardly extending bracket 40 adapted to be engaged by means of a pivot pin 41 to a clevis 42 on the lower end of piston rod 38. Thus it is to be recognized that the four corner cylinders 36 are used to both raise and lower platen 10, while the remaining twenty-eight air cylinders, when actuated, only press downward on the plates 39 which are laid on the upper face of platen 10.

It is thus to be seen that with the composite panel 11, such as a trailer coach floor panel, mounted on supporting deck 12, the application of air to the upper ends of the thirty-two cylinders will force platen 10 firmly against the upper face of the panel 11 which is to have its upper plywood panel anchored thereto by heat setting of an appropriate plastic glue. With each of the cylinders pressing on its own individual plate resting on top of the platen 10, it will be seen that a very flexible pressure application is involved so that if there are any minor inaccuracies in thickness of the plywood panel, in contact with said platen the individual cylinders through the platen 10 will compensate for same, and to a moderate extent force the platen tight against even low spots, and which many times are too small to be seen by the naked eye, but which would vary the sealing pressure and the gluing efficiency. This apparatus thus makes possible highly efficient and satisfactory bonding techniques.

The platen 10 may be formed in various ways and one convenient construction, Figure 6, which has proved satisfactory, involves the use of a 1³⁄₁₆" x 4" pine carrier frame 43 which extends all the way around the platen. The upper edge of the platen is framed with an angle iron 44 which for instance, may be 2½" x 2½" x ³⁄₁₆" in cross section size and the carrier frame 43 may be anchored thereto by means of carriage bolts 45. Inside of the carrier frame 43 are preferably placed several plywood sheets 46, for instance five with the metal plates 39 resting on the top face of the upper sheet of this plywood and wherein the angle iron frame 44 holds said plates against sidewise slippage. Below the bottom of the lower one of these plywood sheets 46 there is preferably placed a sheet or composite panel 47 of cellular cellulose acetate, such, for instance, as is put out by du Pont under the trademark name of "Strux." This sheet is preferably about an inch thick and of the same outside dimensions as the plywood panels 46 which closely fit the inside of carrier frame 43. This sheet of "Strux" acts as a heat and electricity insulating panel and at the same time facilitates slight giving of the platen to match inaccuracies in the contacted surface of the composite panel 11, which is being glued together. To give the lower face of the platen added strength and wearing qualities, a plywood bottom sheet is used and conventionally joined to the carrier frame 43. It is on the under face of this bottom sheet 48 that the positive and negative grid assemblies 23 and 24 are mounted in staggered pattern as has been previously described. The final platen assembly 10 in its preferred construction, and as same has been put in use, has a thickness of approximately 5¹⁄₁₆" although the invention is not limited to that specific thickness, nor specific construction, so long as same has the necessary size and rigidity with limited flexibility to aid in overcoming the effect of inaccuracies in the surface with which same is pressed in contact.

In operating the present apparatus the composite panel 11 is preferably placed on supporting deck 12 with lower plywood panel 15, which is preferably made of one quarter inch plywood, uppermost. The upper panel 14, which is preferably made of half inch plywood, would thus be lowermost at the start of the glue welding procedure which will join the assembly into a finished panel or platform. Plastic glue, as set forth above, will of course have been placed on the faces of the panel framework before the plywood panels were mounted thereon. This glue, which may be of either thermo-plastic or thermo-setting type, is preferably of the latter type which may be set up or hardened by the application of heat in various ways and one way which has been found to be very satisfactory for this purpose involves the use of ultra high frequency electric current.

The machine of the present invention is one which has been developed through extensive testing and experimentation to determine the best type of apparatus which can be used for carrying out the method set forth in the co-pending patent application of Raymond A. Thompson, filed January 14, 1952, Ser. No. 266,342.

Since standard plywood panels come in 4' x 8' sizes and since standard house trailer floor panels are 8' wide, the present machine has been made of a size which will apply glue fusing and welding heat to the upper surface of the composite panel 11 in an area extending 8' crosswise of same and 4' lengthwise, and then handle the complete welding piece by piece of this size as the assembly carried by main frame 2 is moved and operated every four feet down composite panel 11. However it is to be noted that the invention is not limited to a machine of this size, but rather it applies to machines which will operate within the scope and spirit of the present invention.

While the machine may be operated at various frequencies and power output, it has been found that operation at approximately six megacycles and with an output of approximately 27 kva. will heat the face of the panel in the area contacted by the platen 10 to a temperature approximately in the range of 273°–300° F. The application of heat in this manner of the ¼" plywood bottom face panel 15 for approximately 1 minute will form a satisfactory weld, while treatment in like manner for approximately 2 minutes on the ½" upper panel 14 will likewise weld it satisfactorily to the framework. In case the plywood is damp an added 30 seconds of heating should be given for each side of the platform to overcome the effect of this moisture. By applying heat to one face of the panel with this machine in four foot steps from one end to the other, and then by inverting the panel and applying heat in like manner in four foot steps back to the starting end, the heat used will set up the thermo-setting plastic glue in the heated area so as to weld the plywood panels to the longitudinal joist, cross sleepers, and end members of the assembly. With the platform welded into a composite unit in this manner, it is then ready for incorporation into a house trailer or the like in conventional manner.

Other modes of applying the principle of my invention may be employed instead of the one explained, change being made as regards the apparatus herein disclosed, provided the means stated by any of the following claims or the equivalent of such stated means be employed.

I therefore particularly point out and distinctly claim as my invention:

1. A thermo-pressure apparatus, which comprises a framework, a pair of tracks, a supporting deck for a panel member to be subjected to heat and pressure, said tracks being at opposite sides of said supporting deck, holding means for said framework, said holding means including wheeled means for movably mounting said framework on said tracks, a platen means, means supported on said framework for moving said platen means to and from a panel member mounted on said supporting deck and applying suitable pressure to said panel member through said platen member, means for supplying operating power to said means for moving said platen means to and from said panel member, electric conductor means on the face of said platen in position to be pressed into contact with the face of said panel member to be subjected to heat and pressure, and means for supplying a suitable electric current to said electric conductor means for heating said panel member as said current passes through the latter.

2. A thermo-pressure apparatus as set forth in claim 1, wherein said means for moving said platen consists of four double acting cylinders with piston and piston rod, one end of each of which is supported by said frame while the outer end of the piston rod of each cylinder is connected to said platen.

3. A thermo-pressure apparatus as set forth in claim 1, wherein said means for reversibly moving said platen consists of four double acting cylinders with piston and piston rod, said cylinders being mounted on said framework, a plate fixedly mounted substantially at each corner of said platen, and means for connecting the outer end of the piston rod of each cylinder to the corresponding plate on said platen for reversibly moving the latter, and wherein there are a series of additional plates on said platen between said first mentioned four plates, and a corresponding series of cylinders, the outer end of the piston rod of each of which rests substantially on the central portion of one of said plates in position to exert pressure on said platen when desired.

4. A thermo-pressure apparatus as set forth in claim 1, wherein said platen has as part of same a synthetic cellular panel member in contact with the back of the pressure applying face panel of same, said cellular panel being of heat and electricity insulating type while facilitating slight flexing or giving to better allow the face panel of said platen to fit a surface against which it is pressed.

5. A thermo-pressure apparatus as set forth in claim 1, wherein said electric conductor means on the face of said platen is of thin strip material in the form of sidewise spaced positive and negative grids.

6. A thermo-pressure apparatus, which comprises a framework, a pair of tracks, a supporting deck for a panel member to be subjected to heat and pressure, said tracks being at opposite sides of said supporting deck, the upper face of said supporting deck throughout its panel supporting length being substantially parallel with the upper face of said tracks, holding means for said framework, said holding means including both wheeled means for movably mounting said framework on said tracks and means for substantially holding said wheeled means on said tracks at all times under operating conditions, a platen means, means supported on said framework for moving said platen means to and from a panel member mounted on said supporting deck and applying suitable pressure to said panel member through said platen means, means for supplying operating power to said means for moving said platen means to and from said panel member, electric conductor means on the face of said platen in position to be pressed into contact with the face of said panel member to be subjected to heat and pressure, and means for supplying a suitable electric current to said electric conductor means for heating the contacted face of said panel member as said current passes through the latter.

7. A thermo-pressure apparatus as set forth in claim 6, wherein said means for moving said platen consists of four double acting cylinders with piston and piston rod, one end of each of which is supported by said frame while the outer end of the piston rod of each cylinder is connected to said platen.

8. A thermo-pressure apparatus as set forth in claim 6, wherein said means for reversibly moving said platen consists of four double acting cylinders with piston and piston rod, said cylinders being mounted on said framework, a plate fixedly mounted substantially at each corner of said platen, and means for connecting the outer end of the piston rod of each of said cylinders to the corresponding plate on said platen for reversibly moving the latter, and wherein there are a series of additional plates on said platen between said first mentioned four plates, and a corresponding series of cylinders, with piston and piston rod, the outer end of the piston rod of each of which rests substantially on the central portion of one of said plates in position to exert pressure on said platen when desired.

9. A thermo-pressure apparatus as set forth in claim 6, wherein said platen has as part of same a synthetic cellular panel member in contact with the back of the pressure applying face panel of same, said cellular panel being of heat and electricity insulating type while facilitating slight flexing or giving to better allow the face panel of said platen to fit a surface against which it is pressed.

10. A thermo-pressure apparatus as set forth in claim 6, wherein said electric conductor means on the face of said platen is of thin strip material in the form of sidewise spaced positive and negative grids.

11. In an apparatus of the character described, a wheel mounted framework, a multiplicity of air cylinders with each having a piston and piston rod, said cylinders being mounted parallel to each other on said framework and extending in the same direction therefrom, a platen, separate rigid plates on one face of said platen with one for each of said cylinders, two of said plates at each end of said platen being anchored thereto and provided with connecting means on their outer face, means for anchoring the outer end of the piston rod of each cylinder above one of said anchored plates to the latter, said four cylinders anchored to said plates being of double acting type for moving said platen back and forth as desired, the outer end of the piston rod of each of the rest of said cylinders resting substantially on the central portion of its corresponding plate in position to exert pressure thereon as desired, and means for connecting said cylinders to a suitable source of air supply and controlling their operation.

12. In an apparatus as set forth in claim 11, wherein said platen has plywood top and bottom panels, and a synthetic cellular panel member between them and in contact with the inner face of said bottom panel, said cellular panel being of heat and electricity insulating type while facilitating slight flexing or giving to better allow the outer face of said bottom panel of said platen to fit a surface against which it is pressed.

13. In an apparatus of the character described, a platen having at least an upper and a lower panel, and a synthetic cellular panel member between them and in contact with the inner face of said lower panel, said cellular panel being of heat and electricity insulating type, and compressible to facilitate slight flexing of said lower panel of said platen, whereby said lower panel is able to better fit into minor inaccuracies of a surface substantially parallel to the outer face of said lower panel when firmly pressed against same.

14. In an apparatus as set forth in claim 13, wherein said platen is provided with separate connecting means on its upper surface adjacent each of the corners thereof for operatively moving same, and wherein there is mounted on the outer face of its lower panel spaced apart positive and negative electric conductor means, formed from thin strip material, in position to be pressed into contact with an article to be subjected to heat and pressure through said platen.

References Cited in the file of this patent
UNITED STATES PATENTS

| | | |
|---|---|---|
| 856,416 | McLarty | June 11, 1907 |
| 1,563,684 | Black | Dec. 1, 1925 |
| 2,129,276 | Herr | Sept. 6, 1938 |
| 2,217,652 | Quick | Oct. 8, 1940 |
| 2,625,969 | Mann | Jan. 20, 1953 |
| 2,699,325 | Hedin | Jan. 11, 1955 |